CHARLES A. OEHL, OF PORTSMOUTH, NEW HAMPSHIRE.

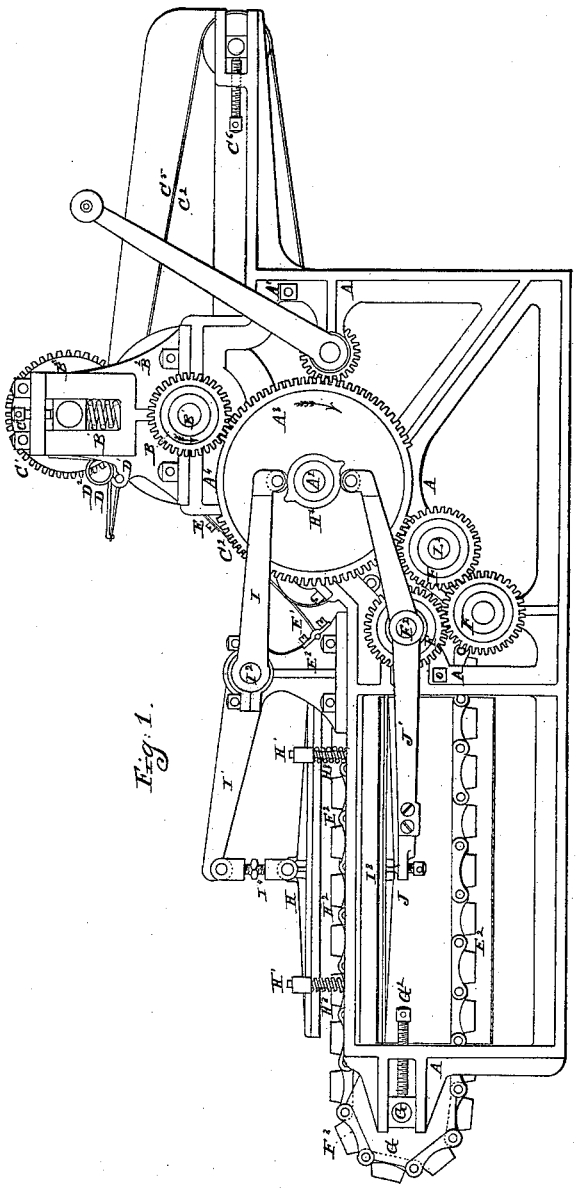

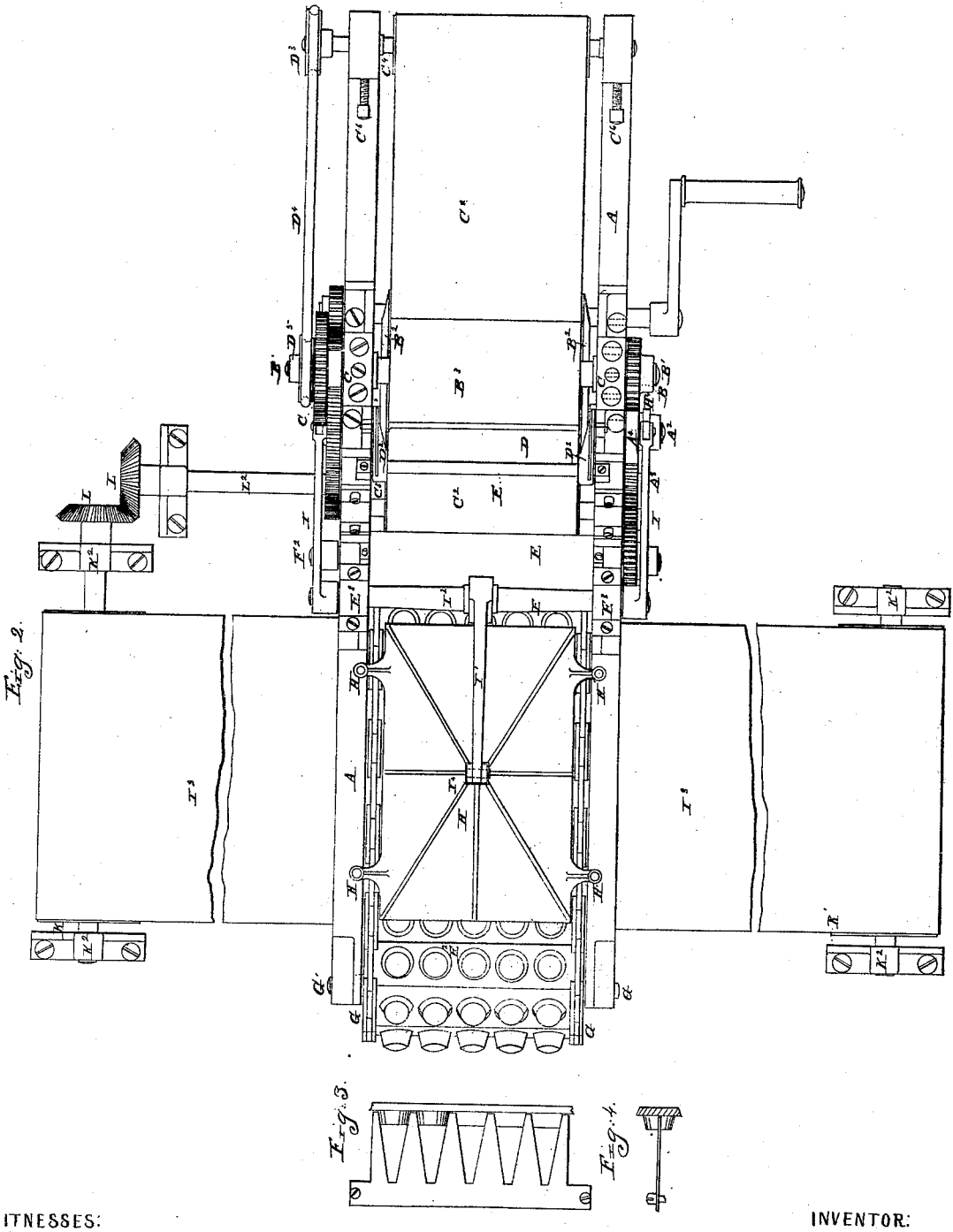

*Letters Patent No. 86,096, dated January 19, 1869.*

---

IMPROVED LOZENGE AND CRACKER-MACHINE.

---

The Schedule referred to in these Letters Patent and making part of the same.

---

*To all whom it may concern:*

Be it known that I, CHARLES A. OEHL, of Portsmouth, Rockingham county, in the State of New Hampshire, have invented a new and improved Lozenge and Cracker-Machine; and I hereby declare the following to be a full and exact description thereof, reference being had to the accompanying drawings, forming part of this specification.

The nature or essence of my invention consists in constructing a cracker or lozenge-machine, so arranged that, by means of devices fully described below, it shall receive and roll the dough, carry it forward a certain space, allow it to stop while the crackers are cut out, they passing through the cutters, and then carry it on again, for another set to be cut, and so on.

In the accompanying drawings—

Figure 1 is an elevation of one side of a machine, with my improvements, and

Figure 2, a plan or top view.

In the above-mentioned drawings—

A A are cast-iron side-frames, connected by the cross-bars $A^1$ $A^1$, which hold them a proper distance apart, and form a strong frame, to which most of the other parts of the machine are attached or connected, as shown in the drawings.

The main shaft $A^2$ is mounted in proper boxes on the sides A, and may have a crank, pulley, or gear fastened to it, to communicate motion from some moving-power, to operate the machine.

The gear $A^3$ is fastened to the shaft $A^2$, and has two spaces, $A^4$ $A^4$, without teeth, to let the rolling and conveying-apparatus stop while the cutting-apparatus forms the crackers or lozenges, as the case may be.

The gear $A^3$ turns the gear B and shaft $B^1$, which carries the main cylinder, which is provided with flanges $B^2$, to prevent the dough rolled between the main cylinder and the cylinder $B^3$ from spreading wider than the length of the cylinders.

The shaft of the cylinder $B^3$ is fitted to turn in boxes arranged to traverse in slots on the sides A of the frame, and are held up by the springs $B^4$, and pressed down by the screws C C, to graduate the thickness of the dough rolled.

The main cylinder and the cylinder B are connected by gears, one of which is shown at $C^1$, to make them turn in unison.

The endless belt or apron $C^2$ passes over the main cylinder, and around over and under the cylinders $C^3$ and $C^4$, to receive the dough to be rolled, which is put upon it between the side-boards $C^5$ $C^5$.

The journals of the cylinder $C^3$ turn in the sides A, and those of the cylinder $C^4$ turn in movable boxes, so that the apron $C^2$ may be tightened, as required, by the screws $C^6$.

The cylinder $C^4$ is turned by the pulley $D^3$ and band $D^4$ to the pulley $D^5$ on the shaft $B^1$ of the main cylinder.

The clearing-plate D, for the cylinder B, is pivoted on the sides A at $D^1$, and pressed against the cylinder by the springs $D^2$, to scrape off any dough that adheres to the cylinder.

The scraper or separator E is arranged across the apron $C^2$, to separate the dough from the apron after it is rolled, in order that it may pass freely on to and over the bridge-plate $E^1$, which delivers it to the endless apron of cutters $E^2$, which should move just as fast as the apron $C^2$, so as to receive the rolled sheet of dough to be cut.

The plate $E^1$ is pivoted on the stand $E^3$, and its edge is pressed against the apron by springs arranged under the plate.

The separator E is fastened to the sides A, as shown in the drawing.

The gear $A^3$ turns the stud-gears F F, one of which turns the shaft $L^2$, and the other turns on a stud in the side A, and turns the gear $F^1$ and shaft $F^2$, which turns in the side A, and has on it two sprocket-wheels, to fit the links of the endless chains $F^3$, which carry the endless apron of cutters $E^2$, which passes around the sprocket-wheels G on the shaft $G^1$, which turns in the movable boxes in the side A, adjusted by the screws $G^2$, to tighten the apron $E^2$.

This apron $E^2$ is composed of bars fastened to the links of the chains $F^3$, each bar carrying a series of cutters, as shown in fig. 2, which cutters are open entirely through the bars, so as to allow the lozenges or crackers cut to pass through the apron of cutters, on to the apron or board arranged under the apron of cutters to receive them.

As the spaces between the cutters open in passing around the wheels G, the pieces or scraps of dough are broken and loosened, and fall from the apron. If any dough should still adhere, it is taken off by the comb-plate, figs. 3 and 4, which is fastened to the sides A in such a manner that the teeth project up between the cutters as they pass below the wheel G.

To press the dough upon the cutters and cut it, I arrange the platen H to traverse vertically on the studs $H^1$ in the sides A, and fasten a sheet of India rubber or gutta-percha, $H^2$, to the under side of the platen, to form a flexible cushion, the platen being held up by the springs $H^3$ on the studs $H^1$, to allow the dough on the cutters to pass under it. Then, at the proper time, the toothless space $A^4$ on the wheel $A^3$ allows the apron of cutters to stop, while the cams $H^4$ on the shaft $A^2$ work the arms I $I^1$ of the rock-shaft $I^2$, and press the platen down upon the cutters, which cut the lozenges or crackers out of the sheet-dough, and they fall through the cutters upon the endless apron $I^3$, or upon a paper or board laid upon the apron to receive them.

The rock-shaft $I^2$ is arranged in the studs $E^3$, which are fastened to the sides A, and the arms I have rollers in their ends, for the cams $H^4$ to act against.

The arm $I^1$ is connected, by a link, $I^4$, to the platen H, which link is provided with a screw, to adjust the platen.

To prevent the apron of cutters from being depressed by the platen when the dough is cut, I arrange a clamping-plate, J, under the apron $I^3$, on an adjusting-screw in the end of the pronged lever J', which vibrates on the ends of the shaft $F^2$, and is acted on by the cams $H^4$, to raise the plate J and apron $I^3$ up to the under side of the cutters, at the same time that the platen presses the dough down into them to cut the crackers, and after they are cut, the plate J and apron $I^3$ drop so low that the crackers deposited by the cutters upon the carrying-apron $I^3$ can be carried away without their being disturbed by the under side of the cutting-apron.

The apron $I^3$ is mounted on the rollers K and $K^1$, which turn in the stands $K^2$, and the shaft of the roller K has the gear L on it, which is turned by the gear $L^1$ on the shaft $L^2$, which extends across the machine, and is turned by the stud-gear F, to traverse the apron $I^3$, at the same time that the apron of cutters is moved to carry the dough under the platen to be cut.

The toothless spaces $A^4$ on the gear $A^3$ allow the rolling-cylinders and apron of cutters, and the conveying-apparatus, to stop while the cutting-apparatus is worked by the cams $H^4$, to cut the crackers or lozenges out of the sheet-dough.

To operate the machine, put the dough upon the apron $C^2$, between the boards $C^5$, and set the machine in motion, and it will roll the dough and carry it forward.

The scraper E separating the dough from the apron, it passes over the bridge-plate $E^1$, on to the apron $E^2$, and when the sheet of dough has been carried a proper distance under the platen, the rolling and carrying-devices stop, and the cam $H^4$ works the platen and clamping-plate, so as to cut the lozenges or crackers, and then the rolling and carrying-apparatus proceeds as before.

1. I claim arranging the cutters in an endless apron, $E^2$, so constructed as to deliver the lozenges or crackers cut through the cutters, substantially as described.

2. In combination with the rolling and cutting-devices, I claim the bridge-plate $E^1$, for conducting the sheet of dough from the apron $C^2$ to the apron of cutters $E^2$, substantially as described.

3. In combination with the apron of cutters $E^2$, I claim the platen H and clamping-plate J, arranged and operated substantially as described.

4. In combination with the rolling and cutting-apparatus described, I claim the carrying-gear $A^3$, provided with toothless spaces $A^4$, substantially as and for the purpose set forth.

5. I claim the combination and arrangement of the arms I and $I^1$, rock-shaft $I^2$, cams $H^4$, and lever J', for the purpose of operating the platen H and clamping-plate J, substantially as described.

6. In combination with the cutting-apparatus, I claim giving to the carrying-belt $I^3$ an intermitting motion, so that it stops while the crackers or lozenges are cut, substantially as described.

7. I also claim the scraper E, across the belt $C^2$, for the purpose of separating the dough from the belt, to prepare it to enter the cutting-apparatus.

C. A. OEHL.

Witnesses:
J. DENNIS, Jr.,
WM. DENNIS.